United States Patent

Jalali et al.

[11] Patent Number: 5,793,907
[45] Date of Patent: Aug. 11, 1998

[54] METHOD AND APPARATUS FOR A WAVELENGTH SELECTIVE TRUE-TIME DELAY FOR AN OPTICALLY CONTROLLED DEVICE

[75] Inventors: Bahram Jalali; Sivasubramaniam S. Yegnanarayanan, both of Los Angeles, Calif.

[73] Assignee: The Regents of the University of California, Oakland, Calif.

[21] Appl. No.: 625,574

[22] Filed: Mar. 28, 1996

[51] Int. Cl.$^6$ ..................................................... G02B 6/28
[52] U.S. Cl. ............................ 385/24; 385/37; 385/46; 359/130
[58] Field of Search ................................ 385/24, 27, 37, 385/46, 39; 359/113, 114, 130

[56] References Cited

U.S. PATENT DOCUMENTS 5,367,586  11/1994  Glance et al. ............................ 385/27 X

OTHER PUBLICATIONS

LJ Lembo et al., "Low–Loss Fiber Optic Time–Delay Element for Phased–Array Antennas," SPIE 194/1450–6/94 vol. 2155, pp. 13–23.

Richard Sorel, "Optical dispersion technique for time–delay beam steering," Applied Optics 10 Dec. 1992/vol. 31 No. 35 pp. 7395–7397.

Goutzoulis et al.; Hardware–compressive 2-D fiber optic delay line architecture for time steering of phase array antennas, ApOp 20 Dec. 1990, vol. 29, No. 36, pp. 5353–5359.

C.T. Sullivan et al.; Switched Time delay elements based on AlGaAs optical waveguide technology at 1.32 um for optically controlled phased array antennas; SPIE vol. 1703 (1992) 264–271.

GA Magel et al.; "Phosphosilicate Glass waveguides for phased–array radar time delay," SPIE vol. 1703 (1992) pp. 373–378.

Willie Ng et al.; The First Demonstration of an Optically Steered Microwave Phased Array Antenna Using True–Time Delay Journal of Lightwave Technology vol. 9, No. 9 IEEE 1991 pp. 1124–1131.

*Primary Examiner*—Phan T.H. Palmer
*Attorney, Agent, or Firm*—Daniel L. Dawes

[57] ABSTRACT

A two dimensional encoded filter for providing wavelength and time shifted output signals is comprised of a photonic integrated device in which the input signal is optically demultiplexed into a plurality of wavelength components, fed back on optically time-delayed feedback paths to a multiplexer which reassembles the signal into a true-time delay wavelength shifted output. The photonic demultiplexer and multiplexer are comprised of a first optical star coupler having a plurality of inputs in which the center input is provided with the input signal. The first star coupler transmits the input signal across a phased array waveguide grating to a second star coupler across which the waveguide components are demultiplexed. The demultiplexed waveguide components are then fed back along feedback loops of differing length to obtain predetermined increments of time delay into the first star coupler from whence the time-delayed fed back signals are multiplexed into the center output of the second star coupler as the time delayed wavelength components of the output signal.

20 Claims, 6 Drawing Sheets

METHOD AND APPARATUS FOR A WAVELENGTH SELECTIVE TRUE-TIME DELAY FOR AN OPTICALLY CONTROLLED DEVICE

BACKGROUND OF THE INVENTION

1. Field of the Invention

The invention relates to the field of photonic signal processing, distribution techniques and communication systems.

2. Description of the Prior Art

Early work on optically controlled phased array radars use simple path length differences, either in free space or in fibers to achieve true-time delay. See, for example, W. Ng et al., "*The First Demonstration of an Optically Steered Microwave Phased Array Antenna Using True-Time Delay,*" IEEE J. Lightwave Technology, Vol. 9, 1124–31 (1991); G. A. Magel et al., "*Phosphosilicate Glass Waveguides for Phased Array Radar Time Delay,*" Optoelectronic Signal Processing For Phased Array Antennas III, Hendrikson editor, Proc. Soc. Photo Opt. Instrum. Eng.; C. T. Sullivan et al., "*Switched Time Delay Elements Based on Aluminum Gallium Arsenide/Gallium Arsenide Optical Waveguide Technology at 1.32 Millimeters for Optically Controlled Phased Array Antennas,*" Optoelectronic Signal Processing for Phased Array Antennas III, Hendrikson and Yow editors, Proc. Soc. Photo-Opt. Instrum. Eng.; and A. P. Goutzoulis et al., "*Hardware Compressive 2-D Fiberoptic Delay Line Architecture for Time Steering of Phased Array Antennas,*" Appl. Opt., Vol. 29, 5353–59 (1990). Chromatic dispersion in optical fibers have also been used for time delay beamed steering. See R. A. Soref, "*Optical Dispersion Technique for Time Delay Beamed Steering,*" Appl. Opt., Vol. 31, 7395–97 (1992). The time delay generator consisted of a rapidly tunable laser diode and a highly dispersive optical fiber. A microwave signal is imposed on the optical carrier by an intensity modulator. Assuming a constant dispersion over the tuning range of the laser, the delay was controlled by selecting the wavelength of the optical signal. Wavelength controlled delay generation is recognized as advantageous because it eliminates the need for special switches. A potential drawback, however, is that the choice of the optical wavelength is limited by the availability of dispersive optical fibers. Furthermore, dispersion in long optical fibers limits the radiofrequency bandwidth.

In another approach, wavelength control of the time delay is achieved using a fiber grating. See L. J. Lembo et al., "*Low Loss Fiber Optic Time Delay Element for Phased Array Antennas,*" Proc. of SPIE, Vol. 2155, 13–23 (1994). In this approach, each grating is designed to provide reflection at a given wavelength within the tuning range of the laser diode. The desired delay is generated by tuning the laser to the wavelength corresponding to the appropriate grating. A circulator extracts the time delay signal and feeds it to the antenna elements. This approach has the advantage of not relying on dispersion available in optical fibers, but present two additional challenges. First, the reflectivity of the grating is proportional to its length. Therefore, in order to achieve high reflectivity, the grating length must be large. On the other hand, the spectral bandwidth of the grating is inversely proportional to its length. Therefore, there is an inherent trade-off between loss and bandwidth of the microwave signal. This trade-off translates to a similar trade-off between bandwidth and crosstalk since a short length grating is less selective to individual wavelengths. Second, the optical circulator which is needed to extract the signal, adds loss and cost to the system.

Therefore, what is needed is some type of true-time delay device that will overcome each of the foregoing difficulties. The device should be such that it eliminates the need for optical circulators, fiber gratings or dispersive fibers. Preferably, it should be fabricated on a single substrate using integrated waveguides and should not inherently incorporate any trade-off between loss and the radiofrequency bandwidth. The solution should be preferably be amenable to high wavelength resolution resulting in a large number of delays in a single integrated device. Further, it should be adaptable in its integrated form to mass production using a fabrication technology compatible with electronic integrated circuits and resulting in an affordable device. For example, it would be preferable to have a device in which a single photolithographic mask level was required in order to fabricate an entire wavelength selective, true-time delay apparatus. Further, the device would be advantageous if multiple N-channel recirculating photonic filters (RFP) could be cascaded to provide $N^m$ delays. This feature would allow two-dimensional beam steering when combined with interstage wavelength conversion using semiconductor optical amplifiers (SOA).

BRIEF SUMMARY OF THE INVENTION

The invention is an apparatus comprising a primary input for receiving an input signal having a plurality of wavelength components, a primary output for outputting a plurality of temporally spaced output signals corresponding to said plurality of wavelength components, and a plurality of input and output feedback ports. The input signal is demultiplexed in a phased array waveguide grating. The input signal on the primary input is spatially distributed or demultiplexed into the plurality of wavelength components by the phased array waveguide grating to the output feedback ports. Each one of the plurality of output feedback ports receives one of the wavelength components of the signal. A corresponding plurality of feedback paths are provided from the output feedback ports to the input feedback ports. Each of the feedback paths has a different path length to introduce correspondingly different time delays into each of the wavelength components. The fedback wavelength components are then multiplexed or combined by the same phased array waveguide grating and delivered to the primary output port. As a result, true-time delay separation of the wave components is obtained in the output signal.

The primary input and output ports, the plurality of input and outputs feedback ports, the phased array waveguide grating and the plurality of time delay paths are optic circuit elements so that wavelength selective true-time delay is optically obtained for the input and output signals. In the illustrated embodiment the phased array waveguide grating includes a first optical star coupler coupled to the plurality of input feedback ports. A second star coupler is included in the phased array waveguide grating and is coupled to the plurality of output feedback ports and the primary output.

The plurality of inputs, outputs, the demultiplexer and multiplexer are geometrically symmetric so that functional operation of the primary input and plurality of input feedback ports on one hand and the primary output and plurality of feedback inputs on the other hand may be reversed with respect to direction of signal transmission and receipt without any affect on operability. Thus optical signals may be received and transmitted through the apparatus.

In one embodiment the apparatus further comprises a tunable laser for generating the input signal, which is thus an electrically modulated optical signal. The plurality of input feedback ports are symmetric about the primary input. The tunable laser is coupled to the primary input. Similarly, the plurality of output feedback ports is symmetric about the primary output. The apparatus further comprises a phased array antenna coupled to the primary output through optical-to-electrical transducing circuits.

In another embodiment the input signal provided by the tunable laser is coded as an optical code division multiple access signal. The apparatus further comprises a second similar unit coupled to the primary output of the first unit, and an optical fiber communicating the two units, so that a code division multiple access optical communication system is provided. In this combination the second unit functions as a decoder.

The invention is also defined as a method comprising the steps of optically demultiplexing a signal into a plurality of wavelength components, and selectively time delaying each of the plurality of wavelength components by a corresponding selective amount of time. The plurality of time delayed wavelength components are optically multiplexed to provide a wavelength and time spread signal.

The steps of optically demultiplexing the signal and optically multiplexing the time delayed wave components are performed in a single symmetrical optical device so that there is no trade-off restriction between bandwidth and loss, and so that lossless autocorrelation is achieved. In the illustrated embodiment, the steps of optically demultiplexing and optically multiplexing are performed in a first optical star coupler forming part of a phased array waveguide grating, which is coupled in turn to a second star coupler also formed as part thereof with a plurality of feedback time delay paths coupled between the second star coupler and the first star coupler. The signal is provided to a primary input to the first star coupler. The step of optically demultiplexing the signal comprises the step of coupling wavelength components of the signal to output feedback ports from the second star coupler. The step of selectively time delaying the waveguide components comprises the step of transmitting the demultiplexed waveguide components through optical paths of differing lengths from the output feedback ports to a corresponding plurality of input feedback ports of the first star coupler. The step of optically multiplexing the time delayed wavelength components comprises the step of coupling the plurality of time delayed waveguide components coupled to the plurality of input feedback ports of the first star coupler to provide a multiplexed wavelength and time shifted output signal on a primary output port of the second star coupler. The steps of optically multiplexing, selectively time delaying, and optically demultiplexing are performed in a single integrated optical device.

The invention may still alternatively be equivalently defined as an apparatus comprising an input for receiving a signal, a demultiplexer for separating the signal into wavelength components, a time delay optical element for introducing a different time delay into each wavelength component of the signal, and a multiplexer for reassembling the signal into time-spread wavelength components, wherein the demultiplexer and multiplexer are a single integrated optical device.

The illustrated embodiment shows the demultiplexer and multiplexer as a single phased-array waveguide grating, which is geometrically symmetric, and shows the a time delay optical element comprising a plurality of feedback paths. Each of the feedback paths has a different signal path length.

The apparatus is also used as a transversal filter wherein in each of the feedback paths between the output feedback ports and input feedback ports is provided with a variable optical attenuator or amplifier in the path to selectively modify the fedback signal magnitude in each corresponding feedback path so that the output signal from the primary output port is a weighted sum of the wavelength components. By this means analog filtering of the input signal is arbitrarily controlled.

The invention and its various embodiments can be better visualized by turning to the following drawings wherein like elements are referenced by like numerals.

The invention and its various embodiments can now be understood in view of the foregoing drawings by referring to the following detailed description.

DETAILED DESCRIPTION OF THE PREFERRED EMBODIMENTS

The basic building block of the true-time delay device of the invention is a phased array waveguide grating. The time delay function is achieved by configuring the grating in a symmetric feedback or recirculating arrangement. Since the performance of the device depends strongly on the waveguide grating, the operation and characteristics of its key parameters will be described in detail for later use in analyzing the performance of the recirculating photonic filter true-time delay device in which the waveguide grating is a component.

Figure 1:
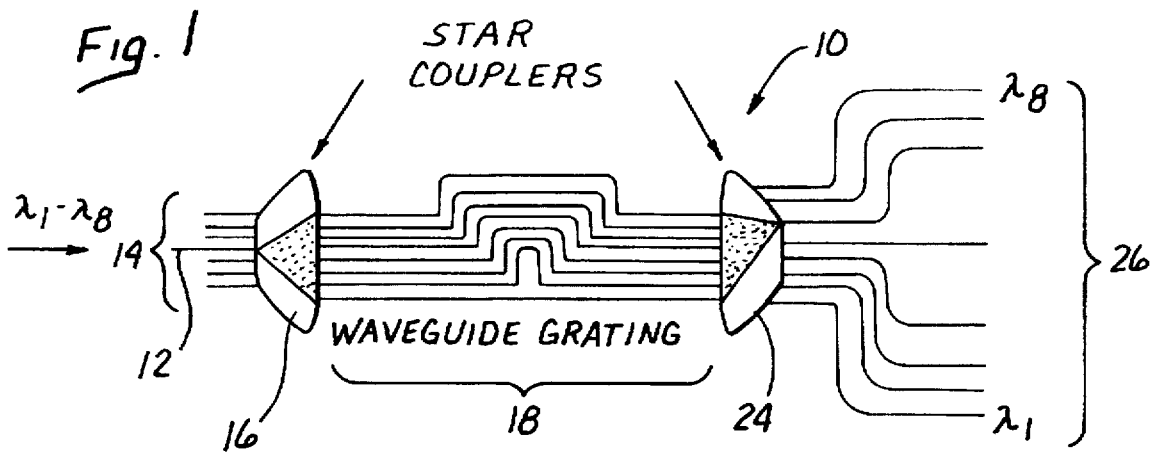
FIG. 1 is a schematic diagram of an optical integrated phased-array waveguide grating demultiplexer also known as a Dragone filter.

Turn now and consider the simplified diagram of FIG. 1 of the true-time delay device of the invention, generally denoted by reference numeral 10. A plurality of wavelengths, in the example of FIG. 1, illustrated as eight wavelengths, $\lambda_1$–$\lambda_8$, are provided on a center optical waveguide 12. Device 10 operates as a wavelength demultiplexer. The optical signal incident on center waveguide 12 of the input array 14 of device 10 is uniformly distributed by star coupler 16 among a plurality of waveguides comprising waveguide grating 18. For example, as shown in greater detail in the diagrammatic depiction of FIG. 2, which depicts the slab region or star coupler 24, the wavelengths converge in a second slab region from arrayed waveguides 20 into one of a corresponding plurality of input/output waveguides 26 depending on the frequency and the optical path length. Since device 10 is symmetric as shown in FIG. 1, it should be noted that it also may serve as a wavelength multiplexer in the reverse direction.

Returning again to FIG. 2, the distance, $\Delta x$, is the spacing of input/output waveguide 14 or 26, while d is the pitch of the arrayed waveguide 20. F is defined as a focal length of star couplers 16 and 24. The ends of arrayed waveguide 20 are widened to reduce the coupling loss. Waveguides 20 have a numerical aperture larger than input/output waveguides 22 in order to collect the diffracted light in the slab region. The grating equation is given by:

$$n_s d \sin \theta_i + n_c \Delta L + n_s d \sin \theta_0 = m\lambda \quad (1)$$

Where $\theta = j\Delta x/F$ is the diffraction angle in the slab region, j is an integer, m the grating order, and $n_s$ and $n_c$ correspond to the effective index of the slab and arrayed waveguides 20, respectively. The center wavelength of device 10 is defined when $\theta_i$ is equal to $-\theta_0$, i.e. the diagonal terminals, or $n_c \Delta L$ is equal to $m\lambda$. Channel spacing can be obtained from the angular dispersion of the output slab using Equation 1 to obtain:

$$\delta f = (\Delta x/F)(d\theta/df)^{-1} = \Delta x/F(m\lambda^2 n_g/n_s dcn_c)^{-1} \quad (2)$$

where $n_g = n_c - \lambda dn_c/d\lambda$

The free spectral range (FSR) of grating 18 must be larger than the total tuning range of the optical source. The free spectral range is determined from Equation 1 and given by:

$$FSR = c/[n_g(\Delta L + d \sin \theta_i + d \sin \theta_0)] \approx c/n_g \Delta L \quad (3)$$

The free spectral range is an essential parameter and places a limit on the number of discrete time delays for a given channel spacing.

Another important parameter is the interchannel crosstalk. This is determined by the passbands spectrum of device 10 which in turn results from the angular dispersion of the focused beam entering output waveguides 22 in the second slab. Assuming Gaussian fields of size $\omega_0$ for the focus light in the waveguide mode, the full width, half maximum (FWHM) of the spectral response is given by:

$$FWHM = 2(\ln 2)^{1/2} \omega_0 \delta f/\Delta x \quad (4)$$

Equations 1–4 are the fundamental relations governing the operation of waveguide grating 18. Consider now how these characteristics are utilized in the recirculating photonic filter.

Figure 3:
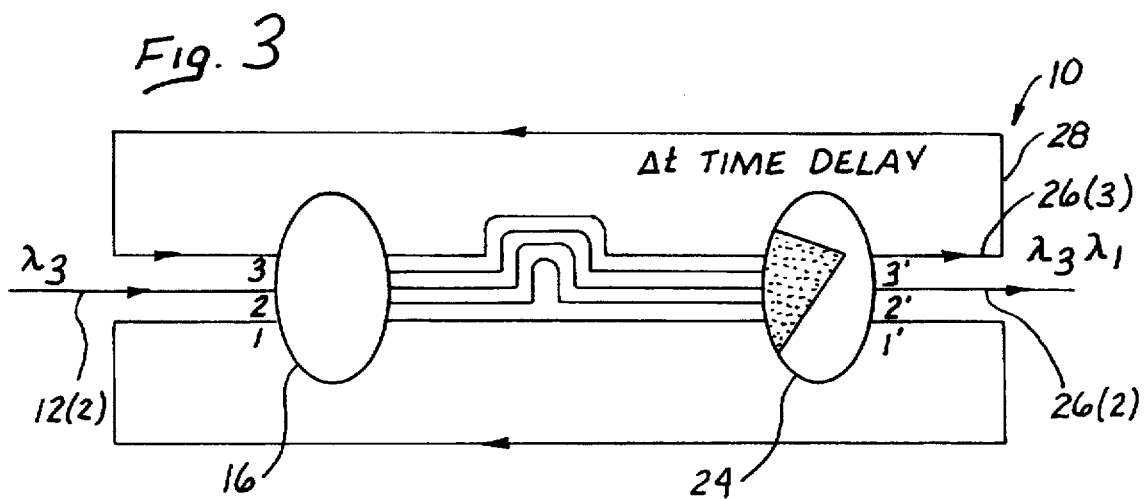
FIG. 3 is a simplified optical schematic of the basic feedback mechanism used to construct true-time delay according to the invention.

Phased array waveguide grating 10 becomes a powerful true-time delay device when connected in a symmetric or recirculating feedback configuration as described below. The concept is illustrated in simple terms in FIG. 3 which shows a grating having only three inputs and outputs for the purposes of simplicity. It is to be understood that the number of inputs and outputs can be arbitrarily multiplied according to the teachings of the invention. The illustrated embodiment of FIG. 3 thus shows a simple 1×3 demultiplexer wherein wavelengths $\lambda_1$, $\lambda_2$, $\lambda_3$, are incident on center waveguide 12. The passive nature of device 10 ensures reciprocity or time reversal symmetry, that is all paths through the device are reversible. Furthermore, since the two star couplers 16 and 24 are identical, device 10 can be flipped end-for-end about a vertical axis running through the illustration of the diagram of FIG. 3 with no change in operation, hence device 10 has geometrical symmetry. Time reversal symmetry and geometrical symmetry are two characteristics of device 10 important to the understanding of its operation as a true-time delay device.

Consider a signal of wavelength $\lambda_3$ which emerges at port 26(3) after entering the center port 12(2). The same wavelength incident at port 12(3) will exit at port 26(2). If port 26(3) is then coupled by virtue of a feedback loop 28 to port 12(3), wavelength $\lambda_3$ incident to center waveguide 12(2) will emerge from center waveguide 26(2) after traversing the feedback path 28. A microwave signal imposed on the optical carrier will therefore be time delayed by a well defined and controllable amount, namely the delay through the device 10 which includes that introduced by feedback loop 28. Thus, there is a one-to-one correspondence between the time delay and the wavelength. This is a fundamental concept behind the operation of true-time delay device 10.

The operation of the invention is further illustrated in connection with a four channel recirculating photonic filter true-time delay device diagrammatically depicted in FIG. 4. A tunable laser 30 or an array of fixed wavelength distributed Bragg reflectors provide four optical wavelengths, $\lambda_1$, $\lambda_2$, $\lambda_3$, and $\lambda_4$, on a center input 12(3) of device 10. These wavelengths are separated and provided to outputs 26(1), 26(2), 26(4) and 26(5) in the order of $\lambda_4$, $\lambda_3$, $\lambda_2$, and $\lambda_1$, respectively. Each wavelength is returned through a corresponding feedback loop 28(0), 28(1), 28(2) and 28(3), respectively, having a zero reference point delay, a $\Delta T$ delay, $2\Delta T$ delay and $3\Delta T$ delay, respectively. The delayed signals are then provided to inputs 12(4), 12(5), 12(2) and 12(1), respectively, to each be fed back in a delayed fashion to center output 26(3). Therefore, it can be appreciated that the optical signals are separated by controllable and defined time delays according to the their wavelength separations.

Figure 4:
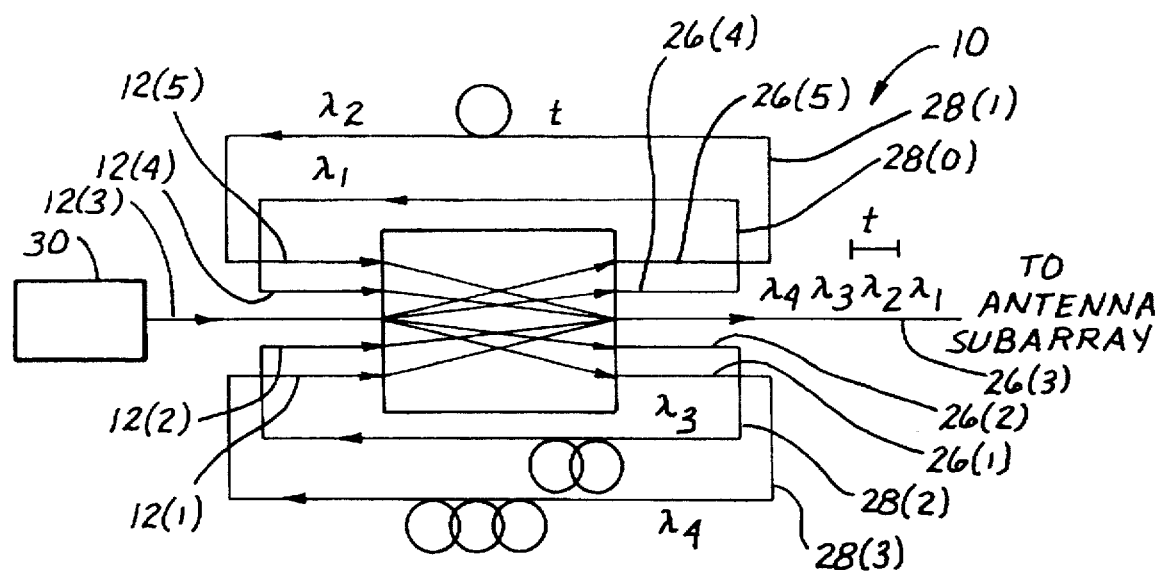
FIG. 4 is a schematic of the recirculating photonic filter of the invention used to feed a phased array antenna.
Figure 5:
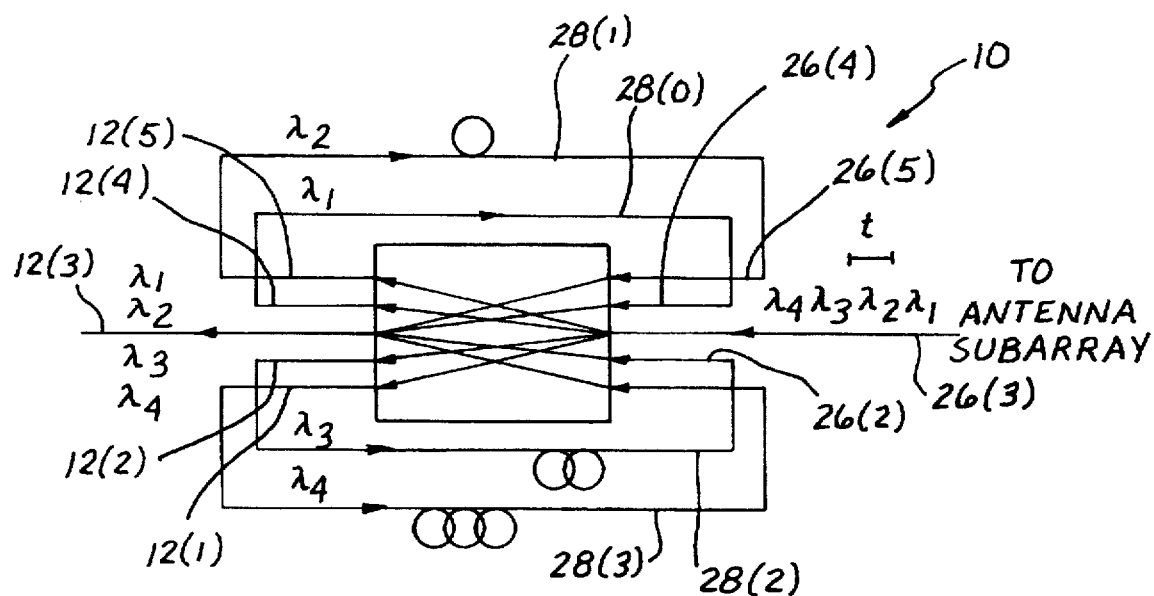
FIG. 5 is the schematic of FIG. 4 wherein the recirculating photonic filter of the invention is used to receive and decode signals from a phased array antenna.

The matched filtering property of the invention is illustrated by comparing the operation of the same four-channel device 10 between FIGS. 4 and 5, wherein the same elements are referenced by the same reference numerals. Four time displaced optical signals, $\lambda_1$, $\lambda_2$, $\lambda_3$, and $\lambda_4$, input into port 26(3) are likewise separated according to wavelength among ports 12(4), 12(5), 12(2), and 12(1), respectively, variously delayed by feedback loops 28(0)–28(3), respectively, by 0, 1, 2 or 3 time delays and output on port 12(3) simultaneously as a multiplexer.

Figure 6:
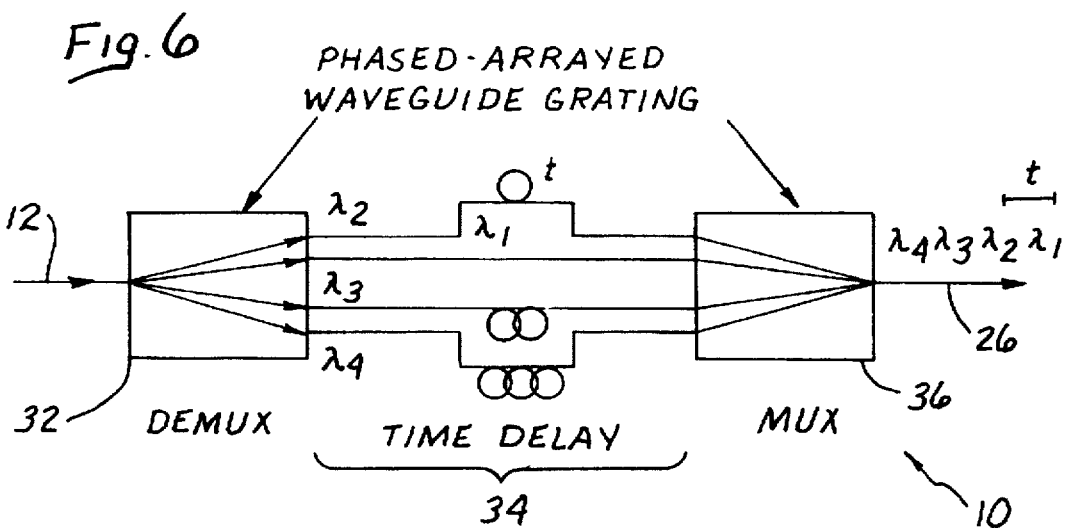
FIG. 6 is a schematic of a topological equivalent of the photonic filter of FIGS. 4 and 5.

The operation of circuit 10, either in the transmit or receive mode of FIGS. 4 and 5, respectively, are topologically equivalent to two phased array waveguide gratings coupled in series with a delay element in-between as schematically depicted in FIG. 6. Operationally, device 10 performs sequential operations, the wavelength demultiplexing by demultiplexer 32 of the incoming signal on line 12, followed by variable phase delays in a time delay photonic circuit 34, followed by multiplexing the time delayed signals in a multiplexer 36 to output a wavelength multiplexed signal and output port 26. However, the advantages of recirculating filter structure of FIGS. 4 and 5 as compared to the serial device of FIG. 6 is that the recirculating filter structure occupies one-third the chip area and assures that the portions of the device performing the multiplexing and demultiplexing operations have identical spectral responses, since the very same filter performs both operations, as opposed to those operations being separated in the serial device of FIG. 6. Because of the inevitable process related variations, any two devices even with identical design structures will nevertheless have slight variations in their spectral responses thereby rendering the series connected approach of FIG. 6 extremely difficult, if not inoperative.

The proposed recirculating photonic filter true-time delay device of the invention has several advantages over the approach of using Bragg fiber grating. The two-port nature of the invention eliminates the need for optical circulators for each antenna element or subarray. Device 10 is fabricated using planar waveguide technology with only one mask level. Therefore, with adequate production volumes, very low cost components can be manufactured. Because of the monolithic approach, device 10 can be easily temperature stabilized using thermal electric elements. Device 10 is further inherently wideband since there is no inherent trade-off between loss and bandwidth. Furthermore, device 10 functions as its own matched filter as was illustrated in connection with the description of circuit operation between FIGS. 4 and 5. As shown in FIG. 5, the time reversed wavelength sequence coming from the antenna or subarray is demultiplexed, delayed by just the correct amount by feedback loops 28(0)–28(3) and multiplexed into port 12(3).

The signal in the time reversed wavelength sequence is a single peak autocorrelation signal corresponding to the transmitted time delay wavelength sequence. As will be discussed below, this feature is particularly powerful when used in optical code division multiple access.

Figure 7:
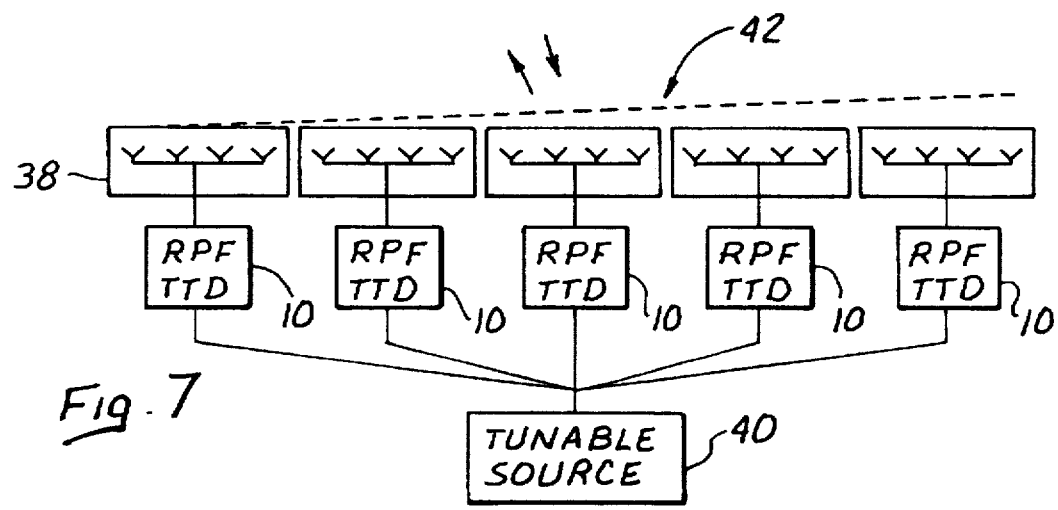
FIG. 7 is a schematic showing the use of the invention in a parallel fed antenna array.

Therefore, device 10 is a universal true-time delay device which can be implemented in a variety of system architectures where antenna elements or subarrays are either fed in parallel or serially. For example, FIG. 7 shows one possible implementation of system architecture disclosed by Lembo, supra. Lembo suggested utilizing a circulator in a Bragg fiber grating as the operative element in a beam steering concept where an array or plurality of subarrays of antennas 38 reach coupled through a circulator and Bragg diffraction grating to a tunable source 40 wherein the laser wavelength was selected to determine beam direction. Therefore, it is essential in Lembo's device that the Bragg gratings should be spaced from each other proportionate to the angular resolution of subarray of antenna elements 38. By tuning the optical carrier wavelength, different sets of Bragg gratings are accessed and a different radiation direction selected, or equivalently in a receive mode. Therefore, according to the invention, device 10 of FIGS. 4 and 5 would replace, in each case, a circulator and a Bragg fiber grating. Each subarray 38 in FIG. 7 thus provides a particular delay for a given optical wavelength.

Antenna array 42, collectively comprised of the plurality of subarrays 38, is time delay steered at the subarray level and phase steered at the element level. Source 40 can be an array of fixed wavelength DBR lasers or a fast tunable laser. The magnitude of time delays depends on the dimension of phased array antenna 42, the maximum steering angle, $\theta_{max}$, and the radiofrequency applied. The maximum delay is $(M\lambda_{RF}/2c)\sin\theta_{max}$ where M is the number elements 38, $\lambda_{RF}$ the radiofrequency wavelength, and c the speed of light. Assuming an RF frequency of 5 GHz and 72×72 element array with a maximum angle of 60 degrees, the maximum delay is thus 6.24 nanoseconds. Typically, the time delay is quantized in units of one RF wavelength with phase shifters providing subperiod control at the subarray level. The total number of discrete time delays is then $M/2\sin\theta_{max} \approx 32$, or 5 bits. The total delay corresponds to approximately 128 centimeters of silica waveguide which are within the scope of present manufacturing reach. Therefore, it is anticipated that an entire 5-bit true-time delay circuit according to the invention can be readily integrated on a single substrate.

Figure 8:
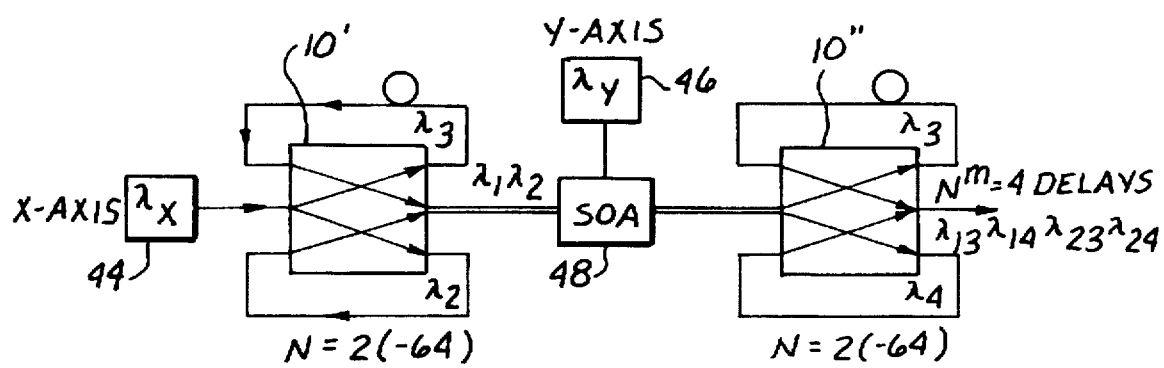
FIG. 8 is a schematic showing m N-channel filters cascaded to provide $N^m$ time delays. It also shows a proposed scheme for performing two-dimensional beam steering in a phased-array antenna, using interstage optical wavelength conversion.

The number of possible time delays can be dramatically increased by cascading devices 10 together. As shown in FIG. 8, two 2-channel devices 10' and 10" are cascaded. There are four possible paths through each device 10' and 10" resulting in four distinct time delays. This can be readily generalized by noting that m such N channel devices 10 connected in series will have $N^m$ delays. Using currently available 64-channel (6 bit) waveguide gratings, the cascading of two such gratings according to the invention provides a 12 bit resolution (4,096 delays).

The total number of delays which may be utilized is limited only by the tunable range of the laser. Since there are practical limits to the degree to which lasers may be tuned, cascaded devices 10' and 10" of FIG. 8 are utilized with interstage wavelength conversion. The use of interstage wavelength conversion allows wavelength reuse among the individual stages, thereby mitigating against the restrictions arising from the limited tuning ranges of available lasers. Furthermore, it enables a two dimensional beam steering and system architectures. For example in FIG. 8, an X beam coordinate from a tunable laser 44 is provided as an input to device 10' while the Y beam coordinates are provided through a second tunable laser 46 to a semiconductor optical amplifier 48. The X and Y beam coordinates are established by tuning each of lasers 40 and 46, respectively, to the appropriate wavelength corresponding to the required time delay. As is evident from FIG. 8, the X and Y coordinates are thereby independently set. The time delayed $\lambda_1$ and $\lambda_2$ signals are then provided as an input to semiconductor optical amplifier 48, which is modulated according to Y axis coordinate from laser 46. The modulated signals are then provided to the input of device 10", which then multiplexes each of the two modulated signals corresponding to $\lambda_1$ and $\lambda_2$ to produce four time delayed signals, $\lambda_{13}$, $\lambda_{14}$, $\lambda_{23}$ and $\lambda_{24}$.

Consider now the characteristic device 10 in terms of the number of delays, loss, temperature stability and the effect of a laser linewidth. The number of discrete delays possible depends upon the maximum tuning range of the laser diode or the gain spectrum of any optical amplifier used, whichever is small, and the minimum channel spacing. To obtain the highest beam steering resolution and maximum steering angle, it is desirable to place the wavelength channels as closely together as possible. The lower limit on interchannel spacing is imposed by two independent factors. First, a channel must have enough bandwidth to accommodate the RF modulation. Assuming double-side band amplitude modulation, the required optical channel bandwidth is $\delta\nu_{opt}=2\delta\nu_{rf}$.

Figure 2:
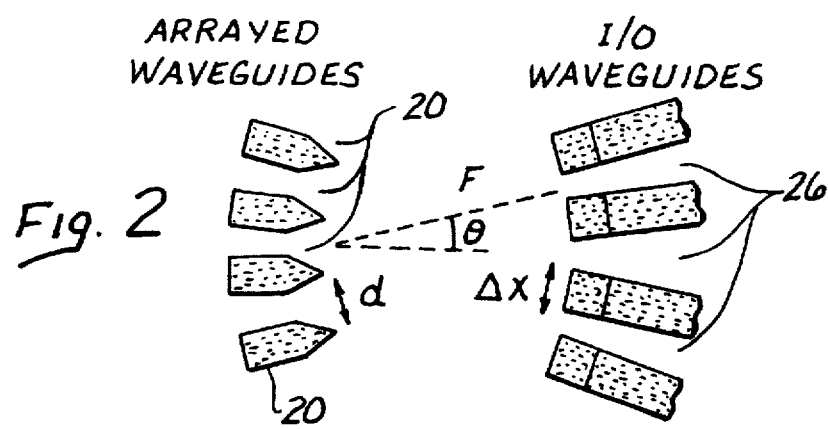
FIG. 2 is a simplified conceptual diagram of the slab region of the phased array waveguide of FIG. 1.

The second factor to consider is the crosstalk in device 10. Because of crosstalk, the actual channel spacing will in general be larger than $2\delta\nu_{rf}$ depending on the shape of the bandpass of device 10. Consider by way of an example, a 6-bit (N=64 wavelengths) phased array waveguide grating based on silica glass waveguide technology, as for example described by K. Okamoto et. al., Electronics Letters, 2 Feb. 1995, vol. 31, no. 3, at pp. 184–86, although devices with even higher 7- to 8-bit resolution can similarly be fabricated with silica waveguide technology. Assume the channel waveguides have dimensions of 3×3 microns and a refractive index of 1.458 for the cladding layer and 1.475 for the core region. The center wavelength is assumed to be 1.3 microns. Assume that require an optical crosstalk no greater than −30 dB. This places the lower limit of $\Delta x$ at 8 microns on the spacing of the waveguides as illustrated in FIG. 2. Crosstalk is then given by Equation (5).

$$\text{crosstalk} = 10 \log |e^{(-\Delta x/\omega_0)^2}| \qquad (5)$$

Where $\omega_0$ is the size of the Gaussian waveguide mode. Assuming an optical tuning range of $\Delta \lambda_{opt}$ of 40 nanometers, the channel spacing is then $\delta \lambda_{opt} = \Delta \lambda_{opt}/N = 0.625$ nanometers, or $\delta v_{opt}$ is 111 GHz. The optical bandwidth is more than sufficient to accommodate the RF bandwidth up to the Ka band.

Choose for convenience the grating waveguide spacing, d, in FIG. 2 to be the same as the input/output waveguide 22 spacing, that is $d = \Delta x = 8$ microns. The product of the focal length and the grating order depends upon the channel spacing, $F_m = n_s \Delta x d / \Delta \lambda_{opt} = 15.1$ centimeters. The choice of the grating order is governed by the requirement that the free spectral range of the filter must be larger than the optical tuning range, that is $N \delta \lambda_{opt} < (\lambda/m)(n_g/n_c)^{-1}$ is less than 32. Choosing M=30, the focal length of the slab region is then found to be F=0.5 centimeters.

One of the key features of the waveguide grating is that it does not have 1/N type splitting losses. All the power in a given wavelength is focused into a single output waveguide. The number of wavelengths or time delays achievable with the proposed recirculation filter is therefore N−1. There are three loss mechanisms in the waveguide grating:

(I) Propagation and bend losses in the waveguides. For silica waveguide technology, the propagation loss is approximately 0.01 dB per centimeter and bend losses are negligible for a bend radius of 5 millimeters or more.

(ii) Grating losses in output star coupler 24. The grating generates higher order peaks in addition to the desired grating order. The power in the side lobes make up the grating loss. However, the side lobes are amplitude tapered by a diffraction of individual grating waveguides. Thus, the loss can be minimized by forcing the Gaussian envelope to be narrow by increasing the waveguide mode size.

(iii) Diffraction losses in input star coupler 16. These losses are due to the tails of the far field Gaussian beam extending outside the grating waveguide array 20. These losses can almost be eliminated by having a higher number of grating waveguides that span the entire far field Gaussian excitation.

Temperature induced shifts in the passband frequency arise primarily due to the temperature dependence of the refractive index. This can be estimated to be a reasonable degree of accuracy by the linear dependence: $n(T) = n_0 + (dn/dT)\Delta T$. The temperature dependence of the pass bend frequency is given by:

$$df/dT = cl(n_c^2 \lambda)dn_c/dT$$

For silica based waveguide technology, the temperature coefficient or refractive index is approximately $1 \times 10^{-5}/°C$, resulting in thermal shift of approximately 1.03 GHz/°C. In many applications, this temperature stability is sufficient, but for applications requiring stability in extreme temperatures conditions, the substrate of device 10 can be temperature controlled using thermal electric currents.

Both finite laser linewidth and wavelength drift can result in interchannel crosstalk, if the magnitude is sufficiently large compared to the passband of the device. For the above example, according to Equation 4, the full width half maximum of the passband is 69.3 GHz. On the other hand, the linewidth of a typical DBR laser is less than 30 MHz. Furthermore, the wavelength drift in a temperature control DBR laser is less than 0.1 nanometer or 17.8 GHz. Therefore, the laser linewidth and laser drift normally expected are largely inconsequential in the device of the invention.

In summary in the illustrated embodiment of the invention, a phased array antenna is driven using optically generated time delays to provide a unique solution to the problems associated with beam squint. The broadband nature of the optical delay lines enable beam steering which is independent of the microwave frequency. This achieved as described below by providing an integrated true-time delay apparatus and methodology wherein the delay is controlled by the optical wavelength. A phased array waveguide grating is used, which is readily integrated on a single substrate using silica or semiconductor waveguide technology. The wavelength selective, true-time delay device comprises a recirculating photonic filter that includes an optical, phased array waveguide grating and a symmetric feedback configuration.

In the transmit and receive mode, a radiofrequency modulated optical carrier steered by the waveguide grating to the appropriate integrated delay line depending upon the carrier wavelength. Radiofrequency modulation of the optical carrier is provided by conventional means. The signal is delayed and then fed back into symmetric input ports provided in the filter. The grating then diffracts the delayed beam into the common output port of the grating.

The true-time delay generator has several advantages over other wavelength selective techniques, namely:

(i) since it is a two port device, it eliminates the need for optical circulators required using the Bragg filter grating approach;

(ii) unlike the optical fiber grating, there is no bandwidth-crosstalk or bandwidth-loss trade-offs, therefore it is inherently broadband with respect to radiofrequency;

(iii) the device can be integrated on a single substrate and is therefore compact, easily temperature controlled, and can be mass produced at low cost;

(iv) the device has no splitting (1/N) loss, i.e. all the power in a given wavelength is diffracted back into the output port; and (v) high resolution of seven to eight bits can be obtained in a single integrated device.

This device therefore has a major performance advantage and application to phased array sensor communication systems of all types.

Furthermore, the proposed device has many other applications in addition to time delay beam steering. For example, as described below, it can be used as a two dimensional code division multiple access filter operating in wavelength and time dimensions. Such a device can perform pulse tagging for secure communications.

Also, what is demonstrated below is a cascaded recirculating photonic filter with interstage wavelength conversion. The wavelength conversion is obtained by semiconductor optical amplifiers. The cascading configuration achieves:

(1) two dimensional beam steering with independent X and Y control;

(2) geometrical increase of resolution since the number of channels scales as $N^m$, where N is a resolution of the individual recirculating photonic filters and m is the number of stages;

(3) loss compensation; and (4) wavelength reuse.

The device can also be used as a photonic feed forward radiofrequency filter for analog signal processing.

Consider now the use of the invention in a spectral temporal encoding filter for wavelength code division multiple access. In the illustrated embodiment below, a two dimensional (wavelength and time) encoding filter is described for security use in optical networks. The filter converts optical pulses into time stretched, coded bit streams where bits are indicated by the different optical wavelengths. In the transmit mode, data bits are coded in both optical wavelength and time domains. In the receive mode, the device performs a unique type of wavelength/time reconstruction of the original data. In contrast to conventional code division multiple access receivers, the output is a delta function with the entire power in the time/wavelength stretched bit squeezed into a single bit, that is the energy of the signal is without side lobes. This perfect autocorrelation is not limited to prime codes as was the case for the prior art and results in excellent receiver signal-to-noise ratios. Two dimensional coding is accomplished in a very low cost device integrated on a single substrate using an existing integrated waveguide technologies.

Active encoding is achieved by putting semiconductor optical amplifiers in the feedback loops in device 10. A monolithic version of the active filter can therefore be fabricated using semiconductor waveguide technology. Different codes can then be obtained by digitally selecting the electronic bias of each optical amplifier. The addition of wavelength coding to time domain CDMA significantly enhances network security and enables simultaneous communication between a large number of nodes. Device 10 facilitates the implementation of wavelength/time CDMA network since it eliminates the need for tunable optical sources or filters. Typically, such devices are severely limited in either tuning speed or range. The perfect autocorrelation of the device provides some of the advantages of coherent CDMA in an incoherent system. And further increases the codes by: an improved signal-to-noise ratio, and freedom from the restriction of using prime codes. The integrated waveguide approach is amenable to mass production at low cost and the all-optical-decoding operation limits the need for ultra high speed electronics thereby removing one of the major impediments against implementation of a spread spectrum fiber optic communication.

Prior to considering the use of device 10 and CDMA, consider first some general features of optical code division multiplexing. First, coding of data bits may be used to provide secure communication in which the coded data stream can only be recovered by a receiving station if the impulse responsive decoder matches the coding function. Second, it allows signals to be coded with the destination address and self-routed to the address through intelligent switching nodes. Third, it permits a data bus to be multiplexed asynchronously through code division multiple access. Fourth, it can be used to interconnect several optical interferometric sensors in a network to a common source and receiver.

Figure 9:
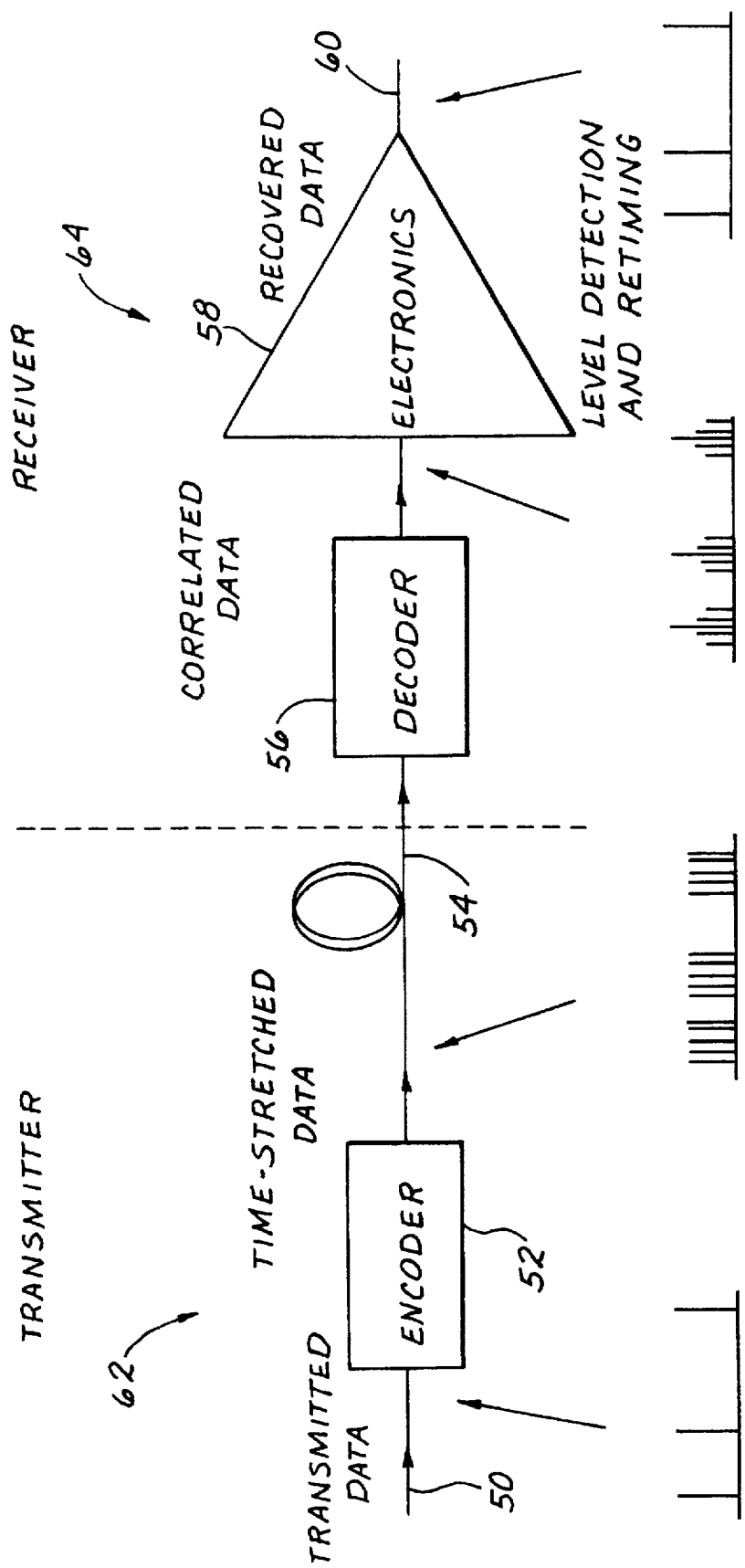
FIG. 9 is a simplified schematic showing the prior art use of code division multiple access (CDMA) in a one dimensional system.

As shown in FIG. 9 in conventional spread spectrum communications, each data bit is encoded or time stretched and is transmitted as a sequence of closely spaced chips. Transmitted data on line 50 is encoded by encoder 52 and transmitted as time stretched data over an optical fiber 54. The data is decoded by decoder 56 and the correlated data then presented in the receiver to electronics 58 for level detection and retiming so that the recovered data is output on line 60. At receiver 64, the original data stream is recreated from the scrambled data by decoder 56 which functions as a matched filter. For a correctly coded signal, the output of the filter is the autocorrelation of the code waveform. The presence of an autocorrelation peak is established by a threshold detection circuit 58 and the lower bandwidth data is reconstructed as shown associated with line 60. Incorrect codes generate a cross correlation and are rejected by threshold detector 58. In order to avoid overlap signals after correlation, the length of the code sequence must be less than half the data.

Figure 10:
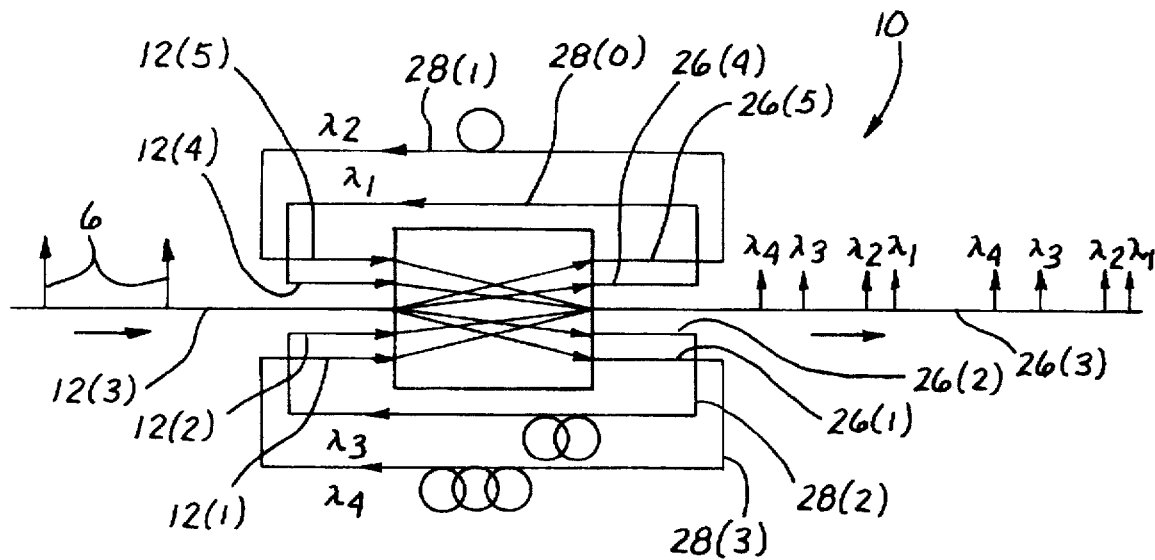
FIG. 10 is a schematic of a two dimensional CDMA system using the invention used in the transmit mode.

The same filter as described in connection with FIG. 4 may be used in a CDMA system of the invention. The recirculating phase array waveguide grating demultiplexer of FIG. 4 is redrawn in FIG. 10 and a pulse train symbolically denoted by arrows 66 instead. In this case, different spectral components of the input pulse train on line 12(3) are demultiplexed into the output waveguides 26(1)–(5). Each wavelength component is then time delayed by a specific amount through corresponding feedback loops 28(0)–(4) to which it is coupled, and during the second pass through phased array wave guide grating 10, the time delayed signals are multiplexed into output port 26(3) to stretch the input signal in both the wavelength and time domains.

Figure 11:
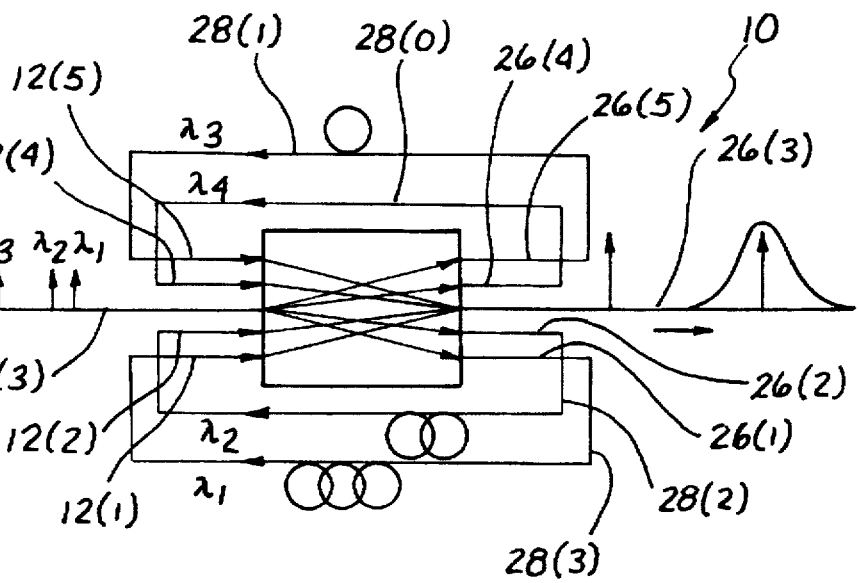
FIG. 11 is a schematic of the two dimensional CDMA system of FIG. 10 using the invention used in the receive mode.

FIG. 11 depicts device 10 used in a receive mode wherein the wavelength and time domain spread of data is received on input port 12(3). The spread data is again demultiplexed, variously phased delayed, and then remultiplexed onto output port 12(3) to reconstitute the original pulse train. Each chip of data is routed in the first pass to one output port 26(i) depending upon its wavelength. After passing though feedback loops 28(i) as appropriate, the data chips are then synchronized. The second pass through device 10 multiplexes the data chips onto output port 12(3) causing a delta function reconstruction of the original bit.

One of the advantages of the invention is that there is no power penalty in the autocorrelation process. In contrast to the prior art autocorrelation waveform shown in the FIG. 9, the coding process of the invention is perfect in the sense that all the power in the spread signal on input 12(3) of FIG. 11 is concentrated into a single central peak. The unique feature of the invention is that this perfect autocorrelation occurs for arbitrary code. In conventional systems of FIG. 9, only specially devised codes, such as prime codes, will have the same or similar behavior. Inasmuch as the system of the present invention is not restricted to prime codes, a large number of users can be accommodated or alternatively, the lack of autocorrelation side lobes leads to a high signal-to-noise ratio.

The spacing of individual data chips in a time stretched coded data is governed by the maximum delay length that can be obtained. Waveguide delays of approximately 100 centimeters on a single substrate using silica waveguide technology are presently achievable. This corresponds to a 5 nanosecond delay. For even longer delays, off chip feedback using an optical fiber can be constructed. The lower limit of delay between the first two data chips, that is the direct path and the path with the shortest feedback length, is governed by the minimum waveguide bend radius. Assuming a bend radius of 5 millimeters, which may be required to maintain low loss, the minimum on-chip delay length is 6.14 centimeters corresponding to a delay of 157 picoseconds. The incremental delay for remaining paths can be as small as a few microns with 3 femtoseconds per micron being the corresponding delay time. Therefore, the technology can be used in applications with a wide range of data rates. For example, in an 8-chip code used in the above example, data rates from 14 megabaud to 1 terabaud may be accommodated by monolithic filter fabricated in silica waveguide technology.

Because filter 10 operates on the spectrum of the incoming signal, it inevitably changes the temporal shape of the data. Each data chip has a smaller bandwidth and, thus, has a longer pulse width than the original data bit. The maximum data rate is limited by the length of the code, which in turn is limited by the band pass of filter 10 given by the full width half maximum equal to equation 4 above, where $\delta f$ is the inter-channel frequency spacing in the filter. In the above example, $\delta f$ is equal to $\delta \lambda c/\lambda 2=31.2$ GHz with $\Delta x=4$ microns or $\omega_0=3$ microns so that the full width half maximum is 38.96 GHz corresponding to the pulse width of 25.7 picoseconds.

The ability to form wavelength coding provided by filter 10 offers two main advantages over conventional CDMA systems that rely on time stretching alone. First, for a given spreading factor, the bandwidth of the coded signal will be smaller because the code has a narrower time spread. This alleviates the requirements on bandwidth of the electronic circuits used in the communication system. Second, the additional codes provided by wavelength encoding improves the security of the optical network. The security features of wavelength/time spreading codes are known and it is concluded that an unprecedented level of security can be reached in a properly configured system. See for example, L. Tincevski et al., "*Secure Optical Network Architecture Utilizing Wavelength Hopping/Time Spreading Code*," EEEE Photonics Technology Letters, Vol. 7, 573–75 (1995), whereas in the prior art, the wavelength hopping was achieved by a laser tuned to a different wavelength for each data chip in the time spread pattern, this mode of implementation to obtain wavelength/time codes is impractical because it requires extremely fast tunable sources or filters. This barrier to utilizing wavelength/time codes is eliminated by the invention which provides perfect autocorrelation to enable simultaneous communication among a large number of nodes.

Figure 12:
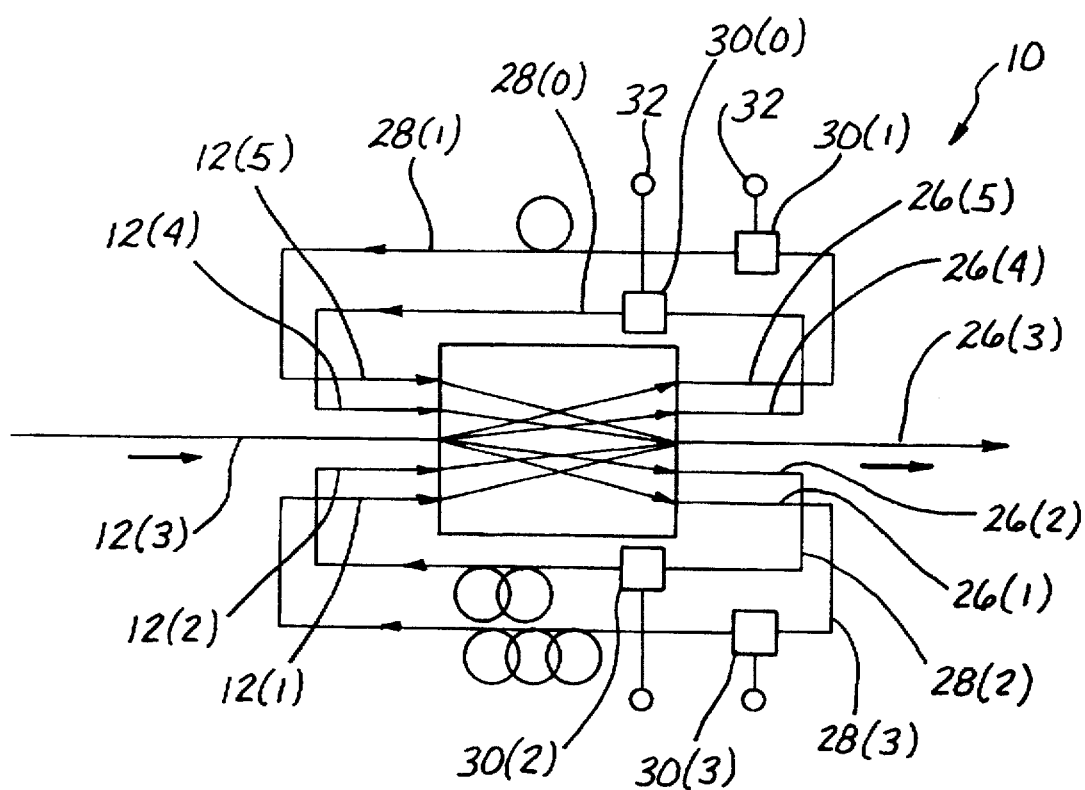
FIG. 12 is a schematic of an embodiment of the invention where an attenuator or amplifier is added in each feedback path to permit utilization of the apparatus as a transversal filter.

FIG. 12 illustrates another embodiment of the invention wherein feedback paths 28(0), (1) (2), (3) have different optical path lengths or time delays as measured between their corresponding output ports 26(1), (2), (4), (5) and input ports 12(1), (2), (4), (5) respectively. Each feedback path 28(0), (1) (2), (3) includes a variable or controllable optical attenuator or amplifier 30(0), (1) (2), (3) respectively by which the feedback signal in that corresponding path length is weighted according to the control signals provided by a conventional control signal source, such as a computer, to the control inputs 32 of each attenuator or amplifier 30(0), (1) (2), (3). Therefore, Fourier analog filtering of the input signal on input 12(3) can be provided in the multiplexed output signal on primary output 26(3).

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus including a phased array waveguide grating comprising:

a primary input of said phased array waveguide grating for receiving an input signal having a plurality of wavelength components;

a primary output of said phased array waveguide grating for outputting a plurality of temporally spaced output signals corresponding to said plurality of wavelength components;

a plurality of input and output feedback ports of said phased array waveguide grating, said input signal being demultiplexed in said phased array waveguide grating, said input signal on said primary input being demultiplexed into said plurality of wavelength components by said phased array waveguide grating to said output feedback ports, each one of said plurality of output feedback ports receiving one of said wavelength components of said signal; and a corresponding plurality of feedback paths provided from said output feedback ports to said input feedback ports, each of said feedback paths having a different path length to introduce correspondingly different time delays into each of said wavelength components, said fedback wavelength components being multiplexed by said same phased array waveguide grating and delivered to said primary output port, wherein said a primary input, primary output, plurality of input and output feedback ports and corresponding plurality of feedback paths form a symmetric passive phased array waveguide grating characterized by reciprocity, and wherein said phased array waveguide grating is vertically symmetric thereby permitting said corresponding input and output ports to be functionally interchangeable, whereby true-time delay separation of said wave components is obtained in said output signal.

2. The apparatus of claim 1 wherein said primary input and output ports, said plurality of input and outputs feedback ports, said phased array waveguide grating and said plurality of time delay paths are optic circuit elements so that wavelength selective true-time delay is optically obtained for said input and output signals.

3. The apparatus of claim 2 wherein said phased array waveguide grating includes a first optical star coupler coupled to said plurality of input feedback ports, and a second star coupler coupled to said plurality of output feedback ports and said primary output.

4. The apparatus of claim 3 wherein said plurality of input and output feedback ports, and said primary input and output are geometrically symmetric so that functional operation of said primary input and plurality of input feedback ports on one hand and said primary output and plurality of feedback inputs on said other hand may be reversed with respect to direction of signal transmission and receipt without any affect on operability and so that optical signals may be received and transmitted through said apparatus.

5. The apparatus of claim 2 further comprising a laser for generating said input signal, and wherein said plurality of input feedback ports are symmetric about said primary input, said laser being coupled to said primary input, and wherein said input signal provided by said laser is coded as an optical code division multiple access signal.

6. The apparatus of claim 5 further comprising a second one of said apparatus coupled to said primary output of a first one of said apparatus, and an optical fiber communicating said first and second apparatus, so that a code division multiple access optical communication system is provided, said second apparatus functioning as a decoder.

7. The apparatus of claim 2 wherein said plurality of output feedback ports are symmetric about said primary output, and further comprising a phased array antenna assembly coupled to said primary output.

8. The apparatus of claim 7 further comprising a tunable laser for generating said input signal, and wherein said plurality of input feedback ports are symmetric about said primary input, said tunable laser being coupled to said primary input.

9. The apparatus of claim 1 wherein said plurality of input and output feedback ports, and said primary input and output are geometrically symmetric so that functional operation of: (a) said primary input and plurality of input feedback ports; and (b) said primary output and plurality of feedback inputs may be reversed with respect to direction of signal transmission and receipt without any affect on operability and so that optical signals may be received and transmitted through said apparatus.

10. The apparatus of claim 2 further comprising a tunable laser for generating said input signal, and wherein said plurality of input feedback ports are symmetric about said primary input, said tunable laser being coupled to said primary input.

11. A method performed in a single phased array waveguide grating comprising:
 optically demultiplexing signal into a plurality of wavelength components in said single phased array waveguide grating;
 selectively time delaying each of said plurality of wavelength components by a corresponding selective amount of time in said single phased array waveguide grating; and
 optically multiplexing said plurality of time delayed wavelength components to provide a wavelength and time spread signal in said single phased array waveguide grating.

12. The method of claim 11 where optically demultiplexing and optically multiplexing in said single phased array waveguide grating are performed in said single phased array waveguide grating having a first optical star coupler forming part of said single phased array waveguide grating, wherein said first optical star coupler has a plurality of input ports, which first star coupler is coupled in turn to a second star coupler also formed as part of said phased array waveguide grating and having a plurality of output ports, wherein optically demultiplexing said signal comprises coupling wavelength components of said signal to off-center ones of a plurality of output ports of said second star coupler, said signal being provided to a center symmetrically positioned one of said input ports of said first star coupler.

13. The method of claim 12 wherein a plurality of feedback time delay paths are coupled between said second star coupler output ports and said first star coupler input ports, and wherein selectively time delaying said waveguide components in said single phased array waveguide grating comprises transmitting said demultiplexed waveguide components through optical paths of differing lengths provided by said plurality of feedback time delay paths.

14. The method of claim 13 wherein optically multiplexing said time delayed wavelength components in said single phased array waveguide grating comprises coupling said plurality of time delayed waveguide components to off-center ones of said plurality of input ports of said first said first star coupler to provide a simultaneously multiplexed wavelength and time shifted output signal on a center one of said plurality of output ports of said second star coupler.

15. The method of claim 11 wherein said single phased array waveguide grating is symmetrical, and where optically demultiplexing said signal and optically multiplexing said time delayed wave components in said single phased array waveguide grating are performed in said single symmetrical phased array waveguide grating so that there is no trade-off restriction between bandwidth and loss, and so that lossless autocorrelation is achieved.

16. The method of claim 11 where optically demultiplexing, selectively time delaying and optically multiplexing in said single phased array waveguide grating are performed in the communication of a code division multiple access signal.

17. The method of claim 11 further comprising providing said simultaneously wavelength and time shifted output signal to a phased array antenna system for beam steering.

18. An apparatus including a phased array waveguide grating comprising:
 a primary input of said phased array waveguide grating for receiving an input signal having a plurality of wavelength components;
 a primary output of said phased array waveguide grating for outputting an output signal corresponding to said plurality of wavelength components;
 a plurality of input and output feedback ports of said phased array waveguide grating, said input signal being demultiplexed in said phased array waveguide grating, said input signal on said primary input being demultiplexed into said plurality of wavelength components by said phased array waveguide grating to said output feedback ports, each one of said plurality of output feedback ports receiving one of said wavelength components of said signal;
 a corresponding plurality of feedback paths provided from said output feedback ports to said input feedback ports, each of said feedback paths having an a different optical path length for each of said wavelength components, said fedback wavelength components being multiplexed by said same phased array waveguide grating and delivered to said primary output port; and a variable optical attenuator or amplifier in each one of said plurality of feedback paths to selectively modify fedback signal magnitude in each corresponding feedback path so that said output signal from the primary output port is a weighted sum of the wavelength components, whereby this means analog filtering of the input signal is arbitrarily controlled.

19. The apparatus of claim 18 where said variable optical attenuator or amplifier in each one of said plurality of feedback paths selectively modifies fedback signal magnitude in each corresponding feedback path to perform transversal filtering.

20. An integrated optical phased-array waveguide grating comprising:

an input of said phased-array waveguide grating for receiving a signal, said phased-array waveguide grating separating said signal into wavelength components;

a plurality of integral optical paths for inserting a different time delay into each said wavelength component of said signal after a first pass through said phased-array waveguide grating, and for coupling said signal back to said input of said phased-array waveguide grating for a second pass therethrough, and said phased-array waveguide grating reassembling said signal into simultaneously time and spread wavelength components after said second pass of said signal through said phased-array waveguide grating, wherein said phased-array waveguide grating is symmetric with respect to direction of propagation of said signal.

* * * * *

UNITED STATES PATENT AND TRADEMARK OFFICE
CERTIFICATE OF CORRECTION

PATENT NO. : 5,793,907
DATED : August 11, 1998
INVENTOR(S) : Jalali, et al.

It is certified that error appears in the above-identified patent and that said Letters Patent is hereby corrected as shown below:

Column 1, line 5, insert the following:

"This invention was made with Government support under Air Force Contract No. AFOSR AF/F49620-96-C-0002. The Government has certain rights in this invention.

Signed and Sealed this

Thirty-first Day of August, 1999

Attest:

Q. TODD DICKINSON

*Attesting Officer*    *Acting Commissioner of Patents and Trademarks*